Oct. 15, 1929.  M. H. JOHANSON  1,731,421
TOOL MECHANISM FOR GEAR CUTTING MACHINES
Filed March 8, 1928

INVENTOR
Magnus H. Johanson
BY
F. Shlesinger
ATTORNEY

Patented Oct. 15, 1929

1,731,421

UNITED STATES PATENT OFFICE

MAGNUS H. JOHANSON, OF ROCHESTER, NEW YORK, ASSIGNOR TO GLEASON WORKS, OF ROCHESTER, NEW YORK, A CORPORATION OF NEW YORK

TOOL MECHANISM FOR GEAR-CUTTING MACHINES

Application filed March 8, 1928. Serial No. 260,231.

The present invention relates to a machine for producing gears and particularly to the tool mechanism of such a machine. More especially this invention relates to tool mechanisms for gear cutting machines where the cutting is accomplished by a reciprocating motion of the tool or tools, the tool or tools cutting on the stroke in one direction and being out of cutting position on the return stroke.

A principal purpose of this invention is to provide an improved form of tool mechanism for gear cutting machines in which the tools for cutting the opposite side faces of the teeth may be mounted on the same slide and brought alternately into position for cutting the opposite side faces of the teeth on successive operating strokes of the slide.

The present invention is particularly applicable to machines in which the blank is indexed between successive operations of the tool mechanism and is especially adapted to machines of this type where the blank is given a continuous indexing rotation.

In machines of the character where the blank is indexed between successive cutting operations, it is usually desirable to employ a single tool slide to avoid unnecessary complications in the tool drive and keep down the cost of the machine. While it has been proposed to mount both tools for cutting the opposite side tooth faces of the blank on the same slide, the preferred practice has been to employ a single tool, because of the tendency to excessive shock and vibration where two tools are cutting simultaneously. Where the single tool is employed, one side tooth face of all the teeth of the blank is first completely cut and then a tool for cutting the opposite side tooth faces is substituted or the tool and blank are set over relatively to each other and the opposite tooth sides finished.

With the present invention, one slide is employed and the two tools for cutting the opposite tooth sides are mounted on this slide in such manner that they may be indexed alternately into cutting position to cut alternately on successive operating strokes of the slide. With this invention, the gear cutting machine can be set up with the two tools arranged to cut the opposite sides of the teeth alternately so that after the cutting operation is begun it is not necessary for the operator to touch the machine until the blank has been finished with the opposite side tooth surfaces of all the teeth completely cut. This invention saves time, the machine requires less of the operator's attention during the cutting of a gear with the consequence that the operator may look after more machines, and at the same time gears can be cut with the required smooth tooth surface finish.

A preferred embodiment of the invention is illustrated in the accompanying drawings, in which.

Figure 1:
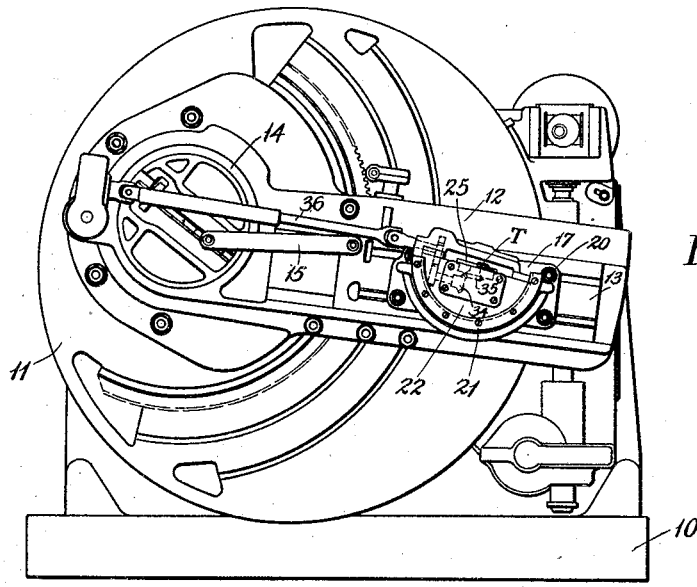
Figure 1 is an elevational view looking at the tool end of a machine equipped with the tool mechanism of this invention.

The present invention is illustrated in use on a machine of the continuous indexing type such as described in Patent No. 1,616,439 granted to Allan H. Candee and the present inventor on February 8, 1927. In this machine, the cutting motion is imparted to the tool mechanism by means of a reciprocating motion of the tool slide and the blank rotates continuously on its axis. The continuous rotation of the blank combines with the tool movement during cutting to produce spiral teeth upon the blank and acts in the interval between successive cutting operations of the tool mechanism to index the blank.

With the present invention, the tool slide carries a pair of cutting tools adapted to cut, respectively, opposite side tooth faces of the blank. In the embodiment illustrated, these tools are mounted in diametrically opposed relation upon a tool block which is rotatably mounted on the tool head. The tool block is intermittently indexed to bring the tools alternately into cutting position. In the arrangement illustrated, the tool block is indexed or rotated a quarter of a turn at the end of each stroke of the tool slide so that the tools cut alternately while moving in the same direction. Assuming that the slide is ready to take its cutting stroke when the machine begins to operate, the cycle of operation is as follows: The slide is given its cutting stroke during which one tool is in cutting position and takes a cut on one side tooth face of the blank; at the end of this stroke the tool block is given a quarter turn moving the tool out of cutting position, the slide then reverses and moves on its return stroke; at the end of the return stroke, the tool block is again given a quarter turn bringing the other tool into cutting position for cutting the opposite side tooth face of the blank on the new cutting stroke; at the end of this second cutting stroke, the second tool is moved out of cutting position, the slide is again reversed and at the end of the return movement the first tool is again brought into cutting position beginning the cycle anew. The slide thus makes two complete reciprocations for each complete rotation of the tool block. During the whole of this time, the blank is rotating continuously and is thus indexed between successive operating strokes of the tools.

Referring now to the drawings by numerals of reference, 10 indicates the base or frame of the machine, 11 the face plate or cradle, 12 the tool arm which is adjustable to permit cutting gears of different spiral angles, 13 the tool slide, 14 the crank and 15 the connecting rod for reciprocating the slide 13. These parts are constructed and operate as in the machine described in Patent No. 1,616,439 and reference may be had to that patent for a more complete description thereof.

Secured to the tool slide 13 and adjustable thereon is the tool head 17. This head may be adjusted upon the slide for cutting gears of different cone distances by rotating the pinion 18 which meshes with a rack (not shown) secured to the slide. The head 17 may be secured in any adjusted position on the slide 13 by means of the bolts 20.

The tool head 17 is provided with an arcuate seat 21 which serves as a support for the tool block carrier 22 which is correspondingly curved to conform to the curvature of said seat. This tool block carrier 22 is adjustable in the seat 21 of the head 17 to permit inclining the cutting tools to the desired angle relative to the path of the tool slide to secure the required clearance for the tools during cutting.

Two tools T and T' are provided which are sharpened so as to cut, respectively, opposite side tooth faces of the blank. These tools are secured in diametrically opposed relation in the rotatable tool block 25 which is mounted for rotation on the tool head carrier 22. Set-screws 26 are employed, as usual, to secure the tools in the sockets 27 and 28 formed in the tool block and taper shims 29 are provided to permit adjusting the tools to take care of wear.

The tool block 25 is adapted to be intermittently rotated to bring the tools T and T' alternately into cutting position so as to operate alternately upon opposite side tooth faces of the gear blank. The intermittent rotation is obtained from a Geneva wheel 30 which is secured to the shaft 31 and which is intermittently rotated by the driving wheel 32 that is keyed to the shaft 33. These two shafts are journaled in the tool block carrier 22. Secured to the shaft 31 at its inner end is a bevel gear 34 which meshes with and drives a bevel gear 35 that is keyed to the tool block 25. The shaft 31 is driven from the telescoping shaft 36 which may be driven by any suitable means, preferably continuously in one direction.

In the machine illustrated, the intermittent drive will be so timed relative to the crank 14 that the tool block 25 will make but half a revolution per each complete revolution of the crank 14. It will be understood, of course, that in the machine shown the crank rotates continuously while the machine is in operation. The drives are so coordinated moreover, that the intermittent mechanism is actuated at the ends of the tool slide strokes when the tools have moved clear of the blank. Through this arrangement, the tool block 25 is given a quarter of a turn at the end of both the cutting and return strokes of the tool slides.

Figure 2:
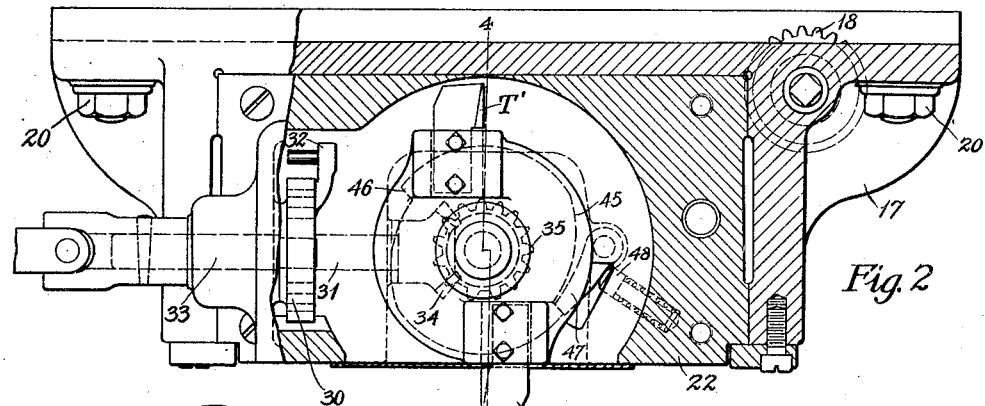
Figure 2 is an enlarged plan view, partly in section, of the tool head of this machine.
Figure 3:
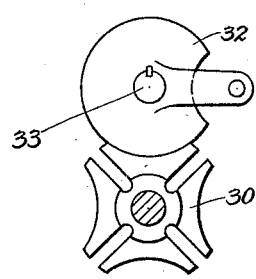
Figure 3 is a detail of the intermittent drive to the tool block.
Figure 4:
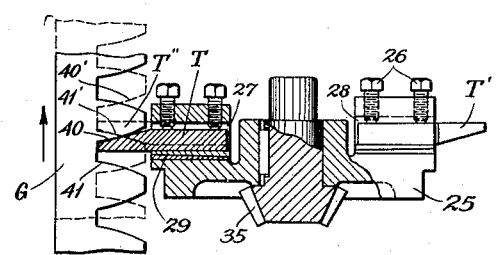
Figure 4 is a section through the tool block on the line 4—4 of Figure 2 and illustrating the relative positions of the tools and blank during cutting.

In the operation of the machine, the tool slide 13 takes a cutting stroke with say the tool T in cutting position; at the end of this stroke and when the tool is clear of the blank the intermittent wheel 30 is actuated giving the tool block a quarter of a turn, moving the tools T and T' to a position 90° from the position shown in Figure 2 with both tools clear of the blank; the wheel 30 then locks up and the slide 13 moves on its return stroke with both tools out of cutting position; at the end of the return stroke the intermittent wheel 30 is again actuated to rotate the tool block 25 a quarter of a turn and bring the tool T' into cutting position to cut a tooth face on the blank opposite to that cut by the tool T on the preceding cutting stroke of the slide 13. At the end of the second cutting stroke of the slide 13 the tool T' is moved clear of the blank by the intermittent mechanism and the slide 22 moves backwardly on its return stroke, as before, with both tools out of cutting position. At the end of this second return stroke, the tool T is again moved into cutting position and the cycle proceeds as before until both sides of all the teeth of the blank have been completely generated. In the machine illustrated, the blank is given a continuous indexing motion for the purpose of producing a spiral tooth shape and of indexing the blank between successive cutting strokes of the tools. As shown in Figure 4, during its cutting stroke the tool T cuts on one tooth side 40 of the blank G. During the return stroke of the slide 13 the tools are clear of the blank as above described. The blank rotating continuously moves half a pitch during this idle return stroke of the slide 13 so that when the tool slide 13 moves again on its operating stroke with the tool T' in cutting position, the opposite side tooth surface 41 of the blank will have moved from the full line position shown in Figure 4 to the dotted line position 41' where it will be engaged and cut by the tool T' which has assumed the dotted line cutting position T''. In this same idle return period, the tooth side 40 will have moved to the dotted line position 40'. The opposite side tooth surfaces of the blank are thus cut successively all around the blank and its teeth completed simultaneously.

To hold the tools up against the cut and take the thrusts of cutting, it has been found desirable to provide an auxiliary locking device to prevent reverse movement of the tool block 25. To this end, the periphery of the block is provided with a double cam surface, as illustrated clearly in Figure 2. This cam surface 45 constitutes a stop plate which is provided with two notches 46 which are adapted to be engaged by the dog 47 that is pivotally mounted upon the tool block carrier 22. A spring pressed plunger 48 which is housed within the carrier 22 serves to urge this dog 47 constantly into locking position. The end of the dog 47 abuts against one of the shoulders formed by the cam surface 45 when either tool is in cutting position and the dog moves freely clear of locking position as the block 25 rotates because of the camming action of the periphery of the block.

The machine illustrated can be made to cut in either direction by substituting for the tool block shown a tool block having the cam surfaces oppositely directed.

While this invention has been illustrated in connection with a particular embodiment and and in connection with a particular machine it is to be understood that the invention is capable of various further modifications and uses and that this application is intended to cover any adaptations or embodiments following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. In a machine for producing gears, a reciprocable tool slide, tool mechanism mounted on said slide including a pair of tools adapted to cut opposite side tooth faces of the blank and so arranged that when one tool is in cutting position the other is out of cutting position, means for reciprocating the slide and means for bringing the tools successively into cutting position whereby opposite side tooth faces of the blank are operated upon on successive operations of the tool mechanism.

2. In a machine for producing gears, a blank support, means for imparting a continuous indexing rotation to the blank, a reciprocable tool slide, tool mechanism mounted on said slide comprising a pair of tools adapted to cut opposite side tooth faces of the blank and so arranged that when one tool is in cutting position the other is out of cutting position, means for reciprocating the tool slide and means for bringing the tools successively into cutting position whereby opposite side tooth faces of the blank are operated upon on successive operations of the tool mechanism.

3. In a machine for producing gears, a reciprocable tool slide, an indexable tool block mounted on said slide, a pair of tools adapted to cut opposite side tooth faces of the blank mounted on said block, means for reciprocating said slide and means for intermittently indexing said block to bring the tools alternately into cutting position for operation upon the blank alternately.

4. In a machine for producing gears, a reciprocable tool slide, a rotatable tool block mounted on said slide, a pair of tools adapted to cut opposite side tooth faces of the blank mounted on said block, means for reciprocating said slide, means for indexing said block intermittently to bring the tools alternately into cutting position, and means for imparting an indexing motion to the blank whereby the blank is indexed between successive operations of the tools and opposite side tooth faces of the blank are operated upon successively.

5. In a machine for producing gears, a blank support, means for imparting a continuous indexing rotation to the blank, a reciprocable tool slide, a rotatable tool head mounted on said slide, a pair of tools adapted to cut opposite side tooth faces of the blank diametrically mounted on said tool block, means for reciprocating said slide and means for imparting an intermittent rotation to said block at the end of each stroke of the tool slide, said intermittent mechanism being so timed relative to the mechanism for reciprocating said slide that the tool block makes half a revolution in one complete cycle of movement of the tool slide.

6. In a machine for producing gears, a blank support, a reciprocable tool slide, a rotatable tool block mounted upon said slide, a pair of tools adapted to cut opposite side tooth faces of the blank diametrically mounted on said block, means for reciprocating said slide, an intermittent mechainism adapted to rotate said head at the end of each stroke of said slide and an auxiliary locking means for holding said block against reverse movement during cutting.

7. In a machine for producing gears, a blank support, a reciprocable tool slide, a rotatable tool block mounted on said slide, a pair of tools adapted to cut opposite side tooth faces of the blank diametrically mounted on said block, means for reciprocating said slide, an intermittent mechanism adapted to rotate said block at the end of each stroke of the tool slide to bring the tools alternately into cutting position, an auxiliary locking means for holding said block against reverse movement during cutting, and means for imparting an indexing movement to the blank whereby the blank is indexed between successive operations of the tools and opposite side tooth faces of the blank are cut successively.

8. In a machine for producing gears, a blank support, means for imparting a continuous indexing rotation to the blank, a reciprocable tool slide, a rotatable block mounted on said slide, a pair of tools adapted to cut opposite side tooth faces of the blank diametrically mounted on said block, means for reciprocating said slide, an intermittent mechanism adapted to rotate said block at the end of each stroke of said slide to bring said tools alternately into cutting position, said intermittent mechanism being so timed relative to the mechanism for reciprocating said slide that the block makes half a revolution in one complete cycle of operation of said slide, and an auxiliary locking means for holding said block against reverse movement during cutting.

9. In a machine for producing gears, a blank support, a reciprocable tool slide, a rotatable tool block mounted on said slide, tools adapted to cut opposite side tooth faces of the blank mounted on said block, means for reciprocating the slide, a stop plate mounted coaxially of said block, a dog adapted to engage the notches of said stop plate to prevent reverse rotation thereof, means for intermittently rotating said block to bring the tools alternately into cutting position and means constantly urging said dog into engagement with the notches of said stop plate.

10. In a machine for producing gears, a blank support, means for imparting a continuous indexing rotation to the blank, a reciprocable tool slide, a rotatable tool block mounted on said slide, tools adapted to cut opposite side tooth faces of the blank mounted on said block, a stop plate mounted coaxially of said head and secured thereto, a dog adapted to engage the notches in said stop plate to prevent reverse movement thereof, means for reciprocating the slide, means for intermittently rotating said block to bring the tools alternately into cutting position, said last named means being so timed relative to the means for reciprocating the slide that the block makes half a revolution in one complete cycle of movement of the slide and means for constantly urging said dog into engagement with the notches of said stop plate.

11. In a machine for producing longitudinally curved tooth gears, a blank support, a reciprocable tool slide, a movable tool block mounted on said slide, a pair of tools mounted on said block for cutting opposite side tooth faces of the blank, means for imparting a continuous indexing rotation to the blank, and means for actuating the block to bring the tools alternately into cutting position.

MAGNUS H. JOHANSON.